(12) United States Patent
Chen (10) Patent No.: US 9,250,684 B1
(45) Date of Patent: Feb. 2, 2016

(54) DYNAMIC POWER CAPPING OF A SUBSET OF SERVERS WHEN A POWER CONSUMPTION THRESHOLD IS REACHED AND ALLOTTING AN AMOUNT OF DISCRETIONARY POWER TO THE SERVERS THAT HAVE POWER CAPPING ENABLED

(71) Applicant: Quanta Computer Inc., Guishan Dist., Taoyuan (TW)

(72) Inventor: Li-Tsung Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 14/631,024

(22) Filed: Feb. 25, 2015

(51) Int. Cl.
*G06F 1/00* (2006.01)
*G06F 1/32* (2006.01)

(52) U.S. Cl.
CPC ............ *G06F 1/3206* (2013.01); *G06F 1/3209* (2013.01); *G06F 1/3234* (2013.01)

(58) Field of Classification Search
CPC ...................................................... G06F 1/3203
USPC ......................................................... 713/300
See application file for complete search history.

(56) References Cited

U.S. PATENT DOCUMENTS

| | | | |
|---|---|---|---|
| 7,702,931 B2 | 4/2010 | Goodrum et al. | |
| 8,032,776 B2 | 10/2011 | Merkin | |
| 8,478,451 B2 | 7/2013 | Li et al. | |
| 8,645,722 B1 | 2/2014 | Weber et al. | |
| 8,661,279 B2 | 2/2014 | Goodrum et al. | |
| 2006/0282685 A1* | 12/2006 | Bahali et al. | 713/300 |
| 2011/0035498 A1* | 2/2011 | Shah et al. | 709/226 |
| 2012/0030493 A1 | 2/2012 | Cepulis et al. | |
| 2012/0116590 A1* | 5/2012 | Florez-Larrahondo et al. | 700/275 |
| 2012/0137158 A1 | 5/2012 | Nelluri et al. | |
| 2012/0226922 A1* | 9/2012 | Wang et al. | 713/320 |
| 2013/0117592 A1 | 5/2013 | Humphrey et al. | |
| 2013/0226362 A1 | 8/2013 | Jagadishprasad et al. | |
| 2014/0101475 A1 | 4/2014 | Berke et al. | |

OTHER PUBLICATIONS

Cisco, "Power Management in the Cisco Unified Computing System", Retrieved from: http://www.cisco.com/c/en/us/solutions/collateral/data-center-virtualization/unified-computing/white_paper_c11-627731.html (2011). (13 pages).

(Continued)

*Primary Examiner* — Thomas Lee
*Assistant Examiner* — Robert Cassity
(74) *Attorney, Agent, or Firm* — Novak Druce Connolly Bove + Quigg LLP (57) ABSTRACT

In some implementations, a system administrator can specify a maximum amount of power for a data center or a rack of servers. If the data center or rack consumes more than a threshold amount of power, the data center or rack can be put into power capping mode. Once in power capping mode, servers in the data center or rack can be power capped. The amount of power at which a server is capped can be dynamically determined based on the amount of discretionary power available to distribute among the power capped servers in the rack or data center and the amount of power that the server consumes relative to other servers in the data center or rack. Once power consumption in the data center or rack falls below a threshold level, power capping for the data center or rack can be disabled.

15 Claims, 5 Drawing Sheets

(56) References Cited

OTHER PUBLICATIONS

Hao et al., "The Data Center as a Grid Load Stabilizer", Retrieved from: http://www.aspdac.com/aspdac2014/technical_program/pdf/2S-3.pdf (Dec. 31, 2010). (26 pages).

Kontorinis et al., "Managing Distributed UPS Energy for Effective Power Capping in Data Centers", Retrieved from: http://cseweb.ucsd.edu/~tullsen/isca2012.pdf (Jun. 2012). (12 pages).

Samson, "Power capping yields savings and floor space", Retrieved from: http://www.infoworld.com/article/2631095/processors/power-capping-yields-savings-and-floor-space.html (Jul. 22, 2009). (6 pages).

Wang et al., "Virtualizing Power Distribution in Datacenters", Retrieved from: http://www.cse.psu.edu/~diw5108/files/ISCA13.pdf (2013). (12 pages).

\* cited by examiner

DYNAMIC POWER CAPPING OF A SUBSET OF SERVERS WHEN A POWER CONSUMPTION THRESHOLD IS REACHED AND ALLOTTING AN AMOUNT OF DISCRETIONARY POWER TO THE SERVERS THAT HAVE POWER CAPPING ENABLED

TECHNICAL FIELD

The disclosure generally relates to server power management.

BACKGROUND

Data centers are often composed of multiple racks of servers. The server racks are configured with power supply units that can safely supply up to a maximum amount of power to the servers in the rack. If one of the power supply units fail, the maximum amount of power that can be safely supplied by the power supply units may decrease. If the servers draw more than the maximum amount of power that can be safely supplied by the working power supply units, the working power supply units may fail and/or the servers in the rack may be damaged.

SUMMARY

In some implementations, a system administrator can specify a maximum amount of power for a data center or a rack of servers. If the data center or rack consumes more than a threshold amount of power, the data center or rack can be put into power capping mode. Once in power capping mode, servers in the data center or rack can be power capped. The amount of power at which a server is capped can be dynamically determined based on the amount of discretionary power available to distribute among the power capped servers in the rack or data center and the amount of power that the server consumes relative to other servers in the data center or rack. Once power consumption in the data center or rack falls below a threshold level, power capping for the data center or rack can be disabled.

Particular implementations provide at least the following advantages: individual servers in a data center or rack can operate at maximum power while the data center or rack operates below a specified warning threshold; servers in the data center or rack are prevented from drawing too much power and causing power supply unit failures once the data center or rack is put into power capping mode; power capping mode can be automatically enabled; power capping power levels can be automatically determined and set for each server in the data center or rack.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
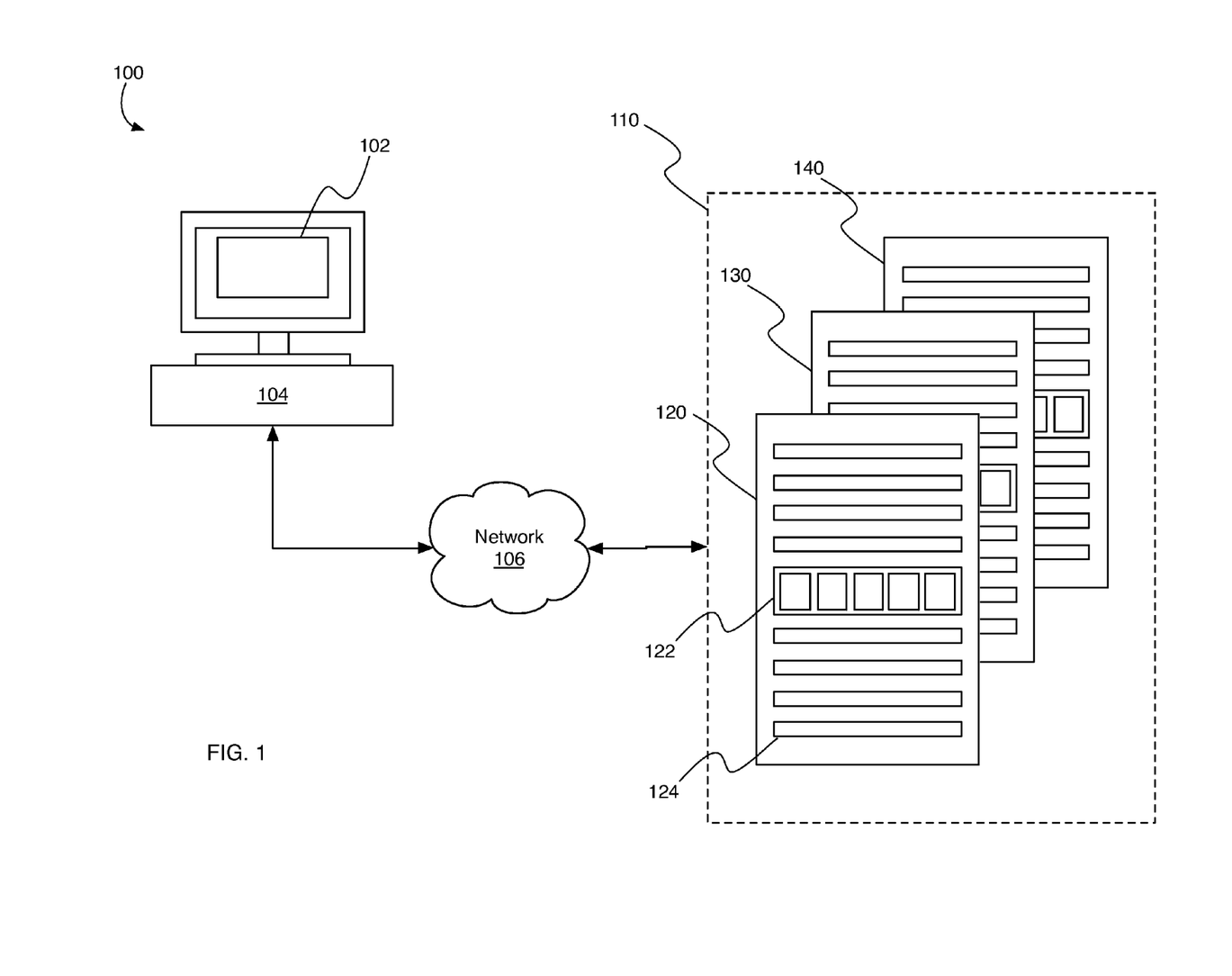
FIG. 1 illustrates an example system for managing power consumption of a data center.

FIG. 1 illustrates an example system 100 for managing power consumption of a data center. For example, system 100 can provide a mechanism by which a system administrator can configure server power capping at a data center or at a server rack using server management software 102.

In some implementations, system 100 can include a management device 104. For example, management device 104 can be a laptop computer, desktop computer, tablet device or other handheld device (e.g., smartphone). Management device 104 can be configured with management software 102. In some implementations, a server or data center administrator can interact with management software 102 to specify power capping parameters for data center 110 and/or server racks 120, 130, and 140. For example, data center 110 can correspond to a group of servers organized into one or more racks 120, 130 and/or 140. Racks 120, 130 and/or 140 can include one or more servers, power supply units, switches, and/or rack management controllers, as described further below. A rack of servers can be considered a subgroup or subset of the data center servers.

In some implementations, management device 104 can send power capping parameters to data center 110 and/or server racks 120, 130 and 140 through network 106. For example, network 106 can be a local area network, a wide area network, or the Internet. The power capping parameters can include, for example, a power limit for data center 110, a power limit for server racks 120, 130 and/or 140, or a power limit for one or more servers (e.g., server 124) in a server rack.

In some implementations, a data center, server rack, and/or individual server can automatically enter a power capping mode based on the server administrator specified power capping parameters. For example, when a system administrator specifies a power limit for a group of servers (e.g., data center, rack, etc.), power capping mode can be dynamically started (e.g., entered, begun) for the group of servers when the total power consumption for the group of servers approaches the specified power limit (e.g., exceeds a threshold percentage of the specified power limit). Power capping mode can be dynamically exited (e.g., terminated, canceled) for the group of servers when the total power consumption for the group of servers drops below a threshold amount of the power limit set for the group of servers. Power capping for each individual server can be dynamically adjusted based on the individual server power requirements as compared to other servers in the group of servers, as described in more detail below.

In some implementations, system 100 can include data center 110. For example, data center 110 can include server racks 120, 130 and/or 140. Server rack 120 can include multiple servers 124. Server rack 120 can include power shelf 122. Power shelf 122 can include one or more power supply units. Power shelf 122 can include a rack management controller, as described below.

In some implementations, a server administrator can use management software 102 to specify power capping parameters for data center 110. For example, a server administrator can specify a power limit (e.g., maximum power rating, power consumption limit, etc.) for data center 110 through a graphical user interface (FIG. 3) of management software 102.

In some implementations, management software 102 can receive power usage statistics from each server rack 120, 130 and 140. For example, a rack management controller in each rack 120, 130 and 140 can monitor the power use of each rack and report power consumption metrics to management software 102. For example, management software 102 can connect to the rack management controller over a network connection to receive power consumption metrics from the rack management controller.

In some implementations, management software 102 can compare the power consumption of each rack to the power limit specified for data center 110. For example, management software 102 can sum the power consumption metrics received for each rack to determine the total power consumption for data center 110. If the total power consumption for data center 110 is greater than a threshold value (e.g., 90% of the specified data center power limit), then management software 102 can cause data center 110 to enter power capping mode. Management software 102 can monitor the total power consumption for data center 110 and cause data center 110 to exit power capping mode when the total power consumption for data center falls below a threshold value (e.g., 70% of the specified data center power limit). For example, different threshold values can be used to determine when to start and stop power capping mode for data center 110.

In some implementations, management software 102 can automatically determine power capping limits for server racks 120, 130 and/or 140 in data center 110. For example, management software 102 can limit the power consumption for racks in data center 110 by setting power consumption limits for the racks when data center 110 is in power capping mode.

In some implementations, to determine power capping limits for server racks 120, 130, and/or 140 in data center 110, management software 102 can determine the amount of discretionary power available to data center 110. Discretionary data center power can, for example, correspond to the amount of power that can be distributed among server racks in data center 110 that have power capping enabled. For example, server rack 120 and server rack 130 can have power capping enabled, while server rack 140 is not power capped. Since server rack 140 is not power capped, server rack 140 will be able to draw as much power as it needs from the data center without any artificial limit (e.g., cap).

In some implementations, discretionary data center power (ddcPower) can be calculated by subtracting the power consumption of non-capped racks (nRacks), e.g., racks with power capping disabled (e.g., rack 140), and the expected power consumption of racks that are currently powered off (oRacks) from the administrator-specified power limit (dcLimit) for the data center (e.g., ddcPower=dcLimit−(nRacks+oRacks)). The discretionary data center power calculation should include powered off racks because the racks may not be power capped when the racks are subsequently powered on.

In some implementations, management software 102 can distribute the discretionary data center power to the power-capped racks (e.g., rack 120, rack 130). For example, management software 102 can determine the power limit for each power-capped rack (rLimit) based on the relative power consumption of each power-capped rack in data center 110. The discretionary data center power can be distributed based on a proportion of a power capped rack's power consumption relative to the total power consumption of the power capped racks in data center 110, for example.

In some implementations, management software 102 can determine the maximum power consumption of rack 120. The maximum power consumption (rPowerConsumption) can be determined based on empirical data. For example, management software 102 can collect power consumption metrics from rack 120 over time (e.g., historical data) and calculate an average of historical power consumption or determine the highest power consumption metric collected based on the collected metrics. The maximum power consumption can be configured based on the specifications of the rack and/or the servers therein. The maximum power consumption can be an administrator-specified value.

In some implementations, management software 102 can determine the maximum power consumption of all power-capped racks in data center 110. For example, management software 102 can sum (e.g., total) the maximum power consumption values for all power-capped racks in data center 110 to determine the total power consumption (tdcPowerConsumption) of power-capped racks data center 110.

In some implementations, management software 102 can determine the power capping limit for rack 120 (rLimit) by multiplying the discretionary data center power (ddcPower) by a ratio of rack 120 power consumption (rPowerConsumption) to total data center power consumption (tdcPowerConsumption). For example, management software can determine the rack power limit by calculating rLimit=ddcPower* (rPowerConsumption/tdcPowerConsumption).

In some implementations, once the power capping limit for rack 120 is calculated, management software 102 can send the power capping limit to rack 120. For example, management software 102 can send the power capping limit to the rack management controller of rack 120. In some implementations, rack 120 can automatically manage power consumption based on the rack power limit calculated by management software 102. For example, the rack management controller of rack 120 can manage power consumption of rack 120 using the power capping techniques described herein below.

Figure 2:
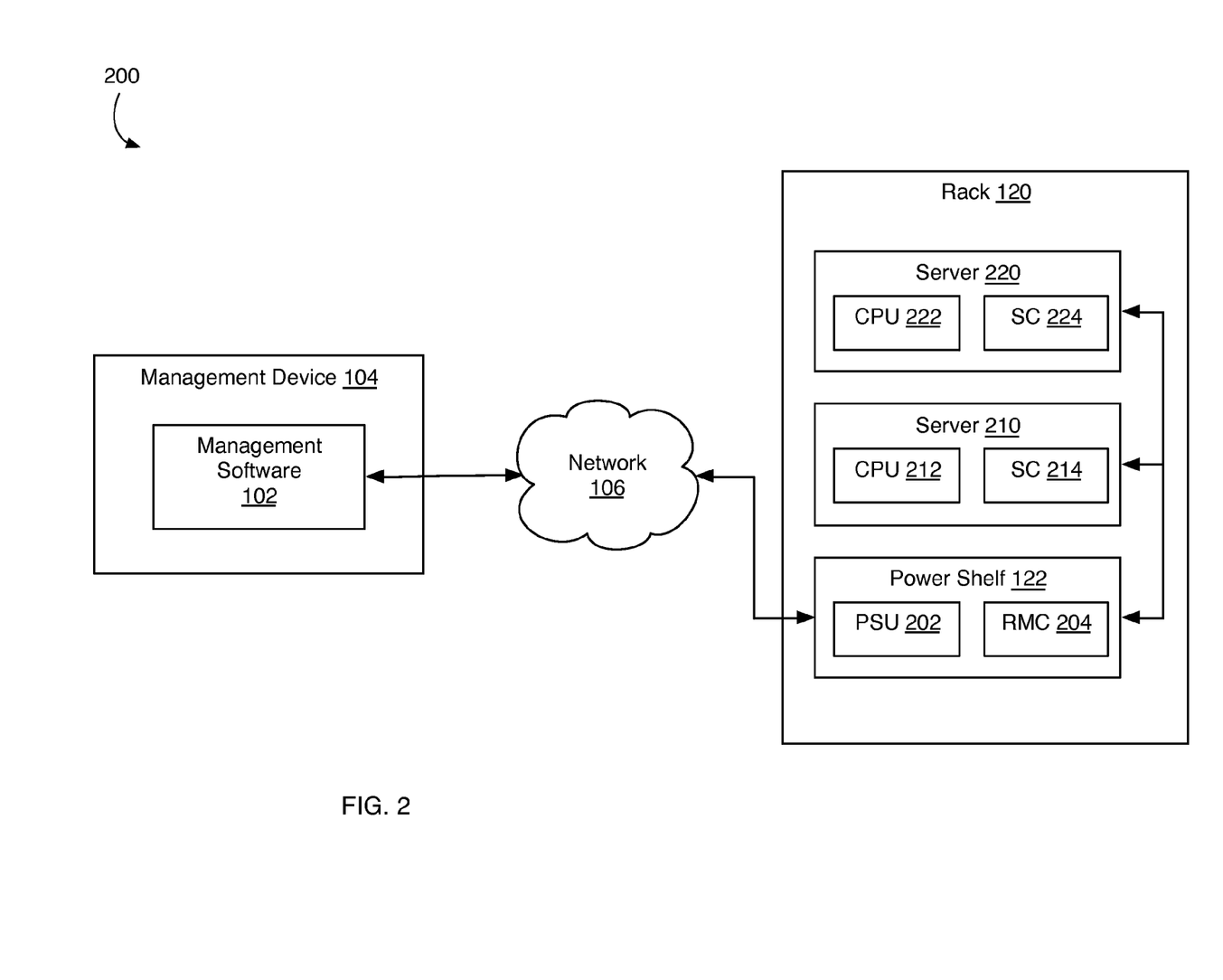
FIG. 2 illustrates a system for managing power consumption of a server rack.

FIG. 2 illustrates a system 200 for managing power consumption of a server rack. System 200 illustrates additional details of system 100, described above. In some implementations, management software 102 can send a rack power capping limit (rLimit) to rack 120. For example, management software 102 can automatically determine the rack power capping limit when data center power capping is performed, as described above. Management software 102 can receive input from a server administrator specifying a power capping limit for rack 120.

In some implementations, management software 102 can send the rack power capping limit for rack 120 to rack management controller (RMC) 204. For example, RMC 204 can be a rack-level processor configured to monitor and control various functions of rack 120. For example, RMC 204 can be housed in power shelf 122 of rack 120. RMC 204 can monitor the health of power supply units 204 and mitigate power failures by turning on backup battery units (not shown). RMC 204 can monitor temperatures within rack 120 and turn on fans, turn off servers, or adjust power consumption to reduce temperatures and protect components.

In some implementations, RMC 204 can monitor power consumption of servers 210 and 220. For example, RMC 204 can be communicatively coupled to service controller (SC) 214 of server 210 and service controller (SC) 224 of server 220. Service controller 214 and service controller 224 can be Baseboard Management Controllers (BMC) or Management Engine (ME), for example. Service controllers 214 and 224 can monitor the power consumption of servers 210 and 220, using known mechanisms. RMC 204 can periodically get power consumption metrics from Service controllers so that RMC 204 can monitor the power consumption of servers 210 and 220 and manage the power consumption of rack 120. RMC 204 can, in turn, send the power consumption metrics to management software 102 so that a server administrator can monitor the power consumption of the servers and implement power capping policies.

In some implementations, RMC 204 can compare the power consumption of servers 210 and 220 to the rack power capping limit (rLimit) received from management software 102 to determine when to start power capping mode for rack 120. For example, RMC 204 can compare the power consumption of each server 210, 220 to the power limit specified by management software 102 for rack 120. RMC 204 can add up the power consumption metrics received from service controller 214 and service controller 224 for each server 210 and 220 in rack 120 to determine the total power consumption for rack 120. Total power consumption for rack 120 can be calculated by adding (e.g., summing, totaling) up the power consumption for all servers in rack 120, for example. If the total power consumption for rack 120 is greater than a threshold value (e.g., 90% of the specified rack power limit), then RMC 204 can automatically enter power capping mode for rack 120. RMC 204 can monitor the total power consumption for rack 120 and exit power capping mode for rack 120 when the total power consumption for rack 120 falls below a threshold value (e.g., 70% of the specified rack power limit). For example, different threshold values can be used to determine when to enter and exit power capping mode for rack 120.

In some implementations, RMC 204 can automatically determine power capping limits for servers 210 and 220 in rack 120 when rack 120. For example, RMC 204 can limit the power consumption for servers in rack 120 by setting power consumption limits for the servers when rack 120 is in power capping mode. To determine power capping limits for servers 210 and 220 in rack 120, RMC 204 can determine the amount of discretionary power available to rack 120. Discretionary rack power can, for example, correspond to the amount of power that can be distributed among servers in rack 120 that have power capping enabled.

In some implementations, discretionary rack power (drPower) can be calculated by subtracting the power consumption of non-capped servers (nServers), e.g., servers with power capping disabled, and the expected power consumption of servers that are currently powered off (oServers) from the administrator or management software 102 specified power limit (rLimit) for rack 120 (e.g., drPower.=rLimit—(nServers+oServers)). The discretionary rack power calculation should include powered off servers because the servers may not be power capped when the servers are powered on and may, therefore, draw too much power from the system.

In some implementations, RMC 204 can distribute the discretionary rack power to the power capped servers. For example, RMC 204 can determine the power limit (sLimit) for each power-capped server based on the relative power consumption of each power-capped server in rack 120. The discretionary rack power can be distributed to the power-capped servers based on a proportion of a power-capped server's power consumption relative to the total power consumption of the power-capped servers in rack 120. The power limit (sLimit) for a server can be the proportional amount of the discretionary rack power distributed to the server.

In some implementations, RMC 204 can determine the maximum power consumption of server 210. The maximum power consumption (sPowerConsumption) of server 210 can be based on empirical data. For example, RMC 204 can collect power consumption metrics (historical data) from service controller 214 and service controller 224 over time. RMC 204 can determine the maximum power consumption by calculating an average of the historical power consumption. RMC can determine the maximum power consumption by determining the maximum power consumption metric in the collected power consumption metrics. The maximum power consumption of server 210 can be based on the specifications of the server and/or the CPUs therein. The maximum power consumption of server 210 can be an administrator-specified value.

In some implementations, RMC 204 can determine the maximum power consumption of all power-capped servers in rack 120. For example, RMC 204 can add up (e.g., total) the maximum power consumption values for all power-capped servers in rack 120 to determine the total power consumption (trPowerConsumption) of power-capped servers rack 120.

In some implementations, RMC 204 can determine the power capping limit for server 210 (sLimit) by multiplying the discretionary rack power (drPower) by a ratio of server 210 power consumption (sPowerConsumption) to total rack power consumption (trPowerConsumption). For example, RMC 204 can determine the server power limit by calculating sLimit=drPower*(sPowerConsumption/trPowerConsumption).

In some implementations, once the power capping limit for server 210 is calculated, RMC 204 can send the power capping limit to server 210. For example, RMC 204 can send the power capping limit to service controller 214 of server 210. Service controller 214 can then adjust various components (e.g., CPU 212) of server 210 so that the server consumes no more power than the specified power capping limit for server 210. In some implementations, service controller 214 can automatically manage power consumption of server 210 based on the server power limit calculated by RMC 204. For example, service controller 214 can adjust the configuration (e.g., p-state, power state, operating state, operating frequency) of CPU 212 to reduce the frequency at which CPU 212 operates and thereby reduce the amount of power consumed by server 210.

The power capping limit can be calculated by RMC 204 for server 220 in a similar manner as server 210. For example, RMC 204 can send a power capping limit to service controller 224 and service controller 220 can adjust various components (e.g., CPU 222) of server 220 so that server 220 consumes less power that the RMC-specified power capping limit. Service controller 224 can automatically manage power consumption of server 220 based on the server power limit calculated by RMC 204. For example, service controller 224 can adjust the configuration (e.g., p-state) of CPU 222 to reduce the frequency at which CPU 222 operates and thereby reduce the amount of power consumed by server 220.

In some implementations, management software 102 can perform the functions of RMC 204 described above. For example, rack 120 may not include RMC 204. Thus, in some implementations, management software 102 can receive power consumption metrics directly from service controllers 214 and 224, determine power capping limits for servers 210 and 220, and communicate the determined power capping limits to service controllers 214 and 224, as described above with reference to FIG. 2 and RMC 204.

Figure 3:
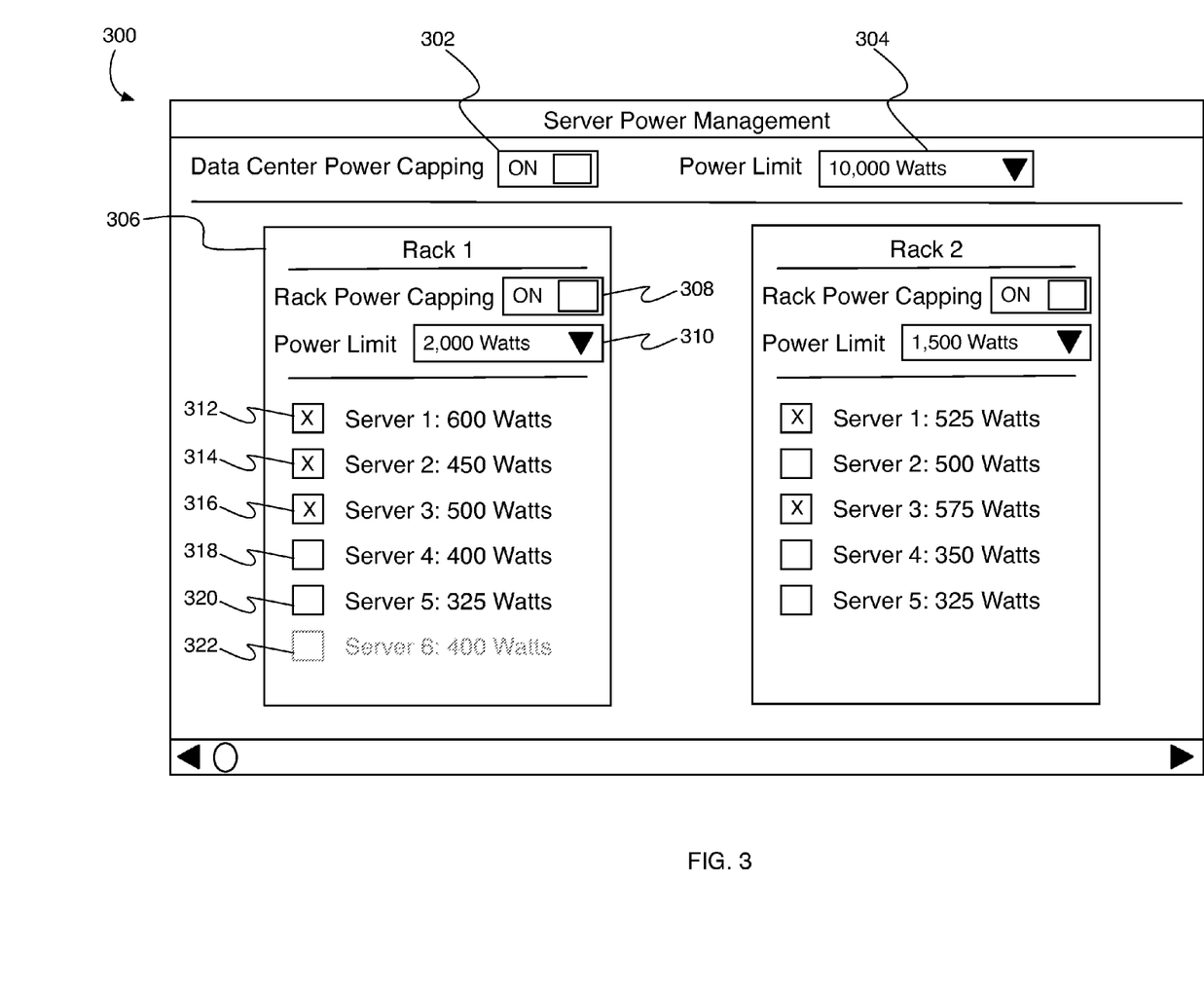
FIG. 3 illustrates an example graphical user interface for managing power consumption of a data center.

FIG. 3 illustrates an example graphical user interface (GUI) 300 for managing power consumption of a data center. For example, GUI 300 can be an interface of management software 102, as described above. A server administrator can provide input to GUI 300 to enable power capping for data centers, racks and/or servers. The server administrator can provide input to GUI 300 to specify power consumption limits for data centers and racks that will be used to perform data center, rack and server power capping, as described above.

In some implementations, GUI 300 can include graphical element 302 for enabling power capping in a data center. For example, a server administrator (i.e., user) can select graphical element 302 to enable or disable power capping in data center 110. GUI 300 can include graphical element 304 for specifying a power limit for data center 110. For example, the server administrator can select from graphical element 304 (e.g., from a pull-down menu, list, etc.) a value indicating an amount of power consumption that the data center cannot exceed. The server administrator can enter text into graphical element 304 that indicates a maximum power value. When power capping is enabled in data center 110, data center 110 will enter power capping mode when the power consumption of the data center exceeds a threshold value (e.g., 90% of the data center power limit). Data center 110 will exit power capping mode when the power consumption of the data center drops below a threshold value (e.g., 70% of the data center power limit).

In some implementations, GUI 300 can include graphical element 306 for specifying power capping parameters for a server rack. For example, graphical element 306 can represent server rack 120 in data center 110. GUI 300 can include a graphical element 306 corresponding to each rack in data center 110, for example.

In some implementations, graphical element 306 can include graphical element 308 for enabling power capping in a server rack. For example, a server administrator can select graphical element 306 to turn on and off power capping for server rack 120. Graphical element 306 can include graphical element 310 for specifying a power limit for server rack 120. For example, the server administrator can select a value from graphical element 310 (e.g., a pull-down menu, list, etc.) a value indicating an amount of power consumption that server rack 120 cannot exceed. The server administrator can enter text into graphical element 310 that indicates a maximum power value for server rack 120. When power capping is enabled in server rack 120, server rack 120 will enter power capping mode when the power consumption of server rack 120 exceeds a threshold value (e.g., 90% of the rack power limit). Server rack 120 will exit power capping mode when the power consumption of server rack 120 drops below a threshold value (e.g., 70% of the rack power limit).

In some implementations, graphical element 306 can include graphical elements 312-322 for enabling and disabling power capping for servers in a server rack. For example, graphical elements 312-322 can correspond to servers (e.g., server 210, server 220) in server rack 120. A server administrator can select individual graphical elements 312-322 (e.g., check boxes, switches, toggles, etc.) to enable or disable power capping for the corresponding server.

In some implementations, graphical element 306 can indicate the maximum power consumption for each server in a rack. For example, graphical element 306 can present graphical elements 312-322 that identify a corresponding server (e.g., server 210, server 220, etc.) in rack 120 and the maximum amount of power that each server consumes. When rack 120 is in power capping mode, rack 120 can use the maximum power consumption values to determine how to distribute the rack's discretionary power to the servers in the rack.

For example and as described above, discretionary power can be calculated by subtracting the power consumption of non-power capped servers and the power consumption of powered off servers from the power limit of the rack. Referring to graphical element 306, rack 120 includes three power capped servers (e.g., Server 1, Server 2, Server 3) corresponding to selected (e.g., checked box) graphical elements 312, 314, and 316. Rack 120 includes two non-power capped servers (e.g., Server 4, Server 5) corresponding to graphical elements 318 and 320. Rack 120 includes one powered off server (e.g., Server 6) corresponding to graphical element 322. To calculate discretionary power for rack 120 (e.g., Rack 1), the power consumption of the two non-power capped servers (Server 4: 400 Watts; Server 5: 325 Watts) and the power consumption of the powered off server (Server 6: 400 Watts) can be subtracted from the power limit of rack 120 (2,000 Watts). Thus, the discretionary power for rack 120 is 875 Watts (e.g., 2000−(400+325+400)).

Continuing the example above, the discretionary power for rack 120 can be distributed to the power capped servers (e.g., Server 1, Server 2, Server 3) based on the relative amount of power consumed by each server. For example, the amount of discretionary power allocated to Server 1 can be calculated by multiplying the discretionary power (875 Watts) by the ratio of the server's power consumption (e.g., 600 Watts) to total power consumption of all power capped servers in rack 120 (e.g., 600 Watts+450 Watts+500 Watts=1550 Watts). Thus, the amount of discretionary power allocated to Server 1 is 338 Watts (e.g., 875*(600/1550)). The amount of discretionary power allocated to Server 2 is 254 Watts (e.g., 875*(450/1550)). The amount of discretionary power allocated to Server 3 is 282 Watts (e.g., 875*(500/1550)).

A similar process can be used to determine the discretionary power for the data center and the allocation of discretionary power to racks within the data center, as described above with reference to FIG. 1.

Figure 4:
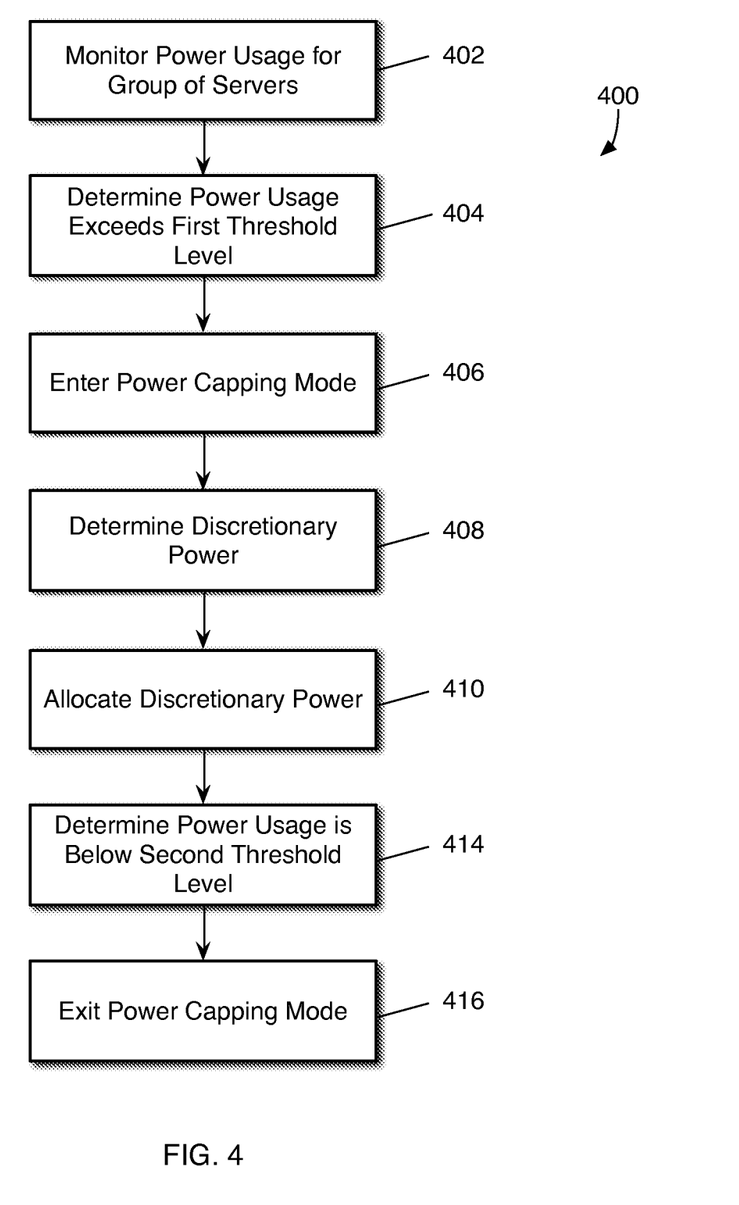
FIG. 4 illustrates an example process for dynamic server power capping.

FIG. 4 illustrates an example process 400 for dynamic server power capping. For example, process 400 can be used to manage server power consumption at the data center level and/or at the server rack level.

At step 402, a computing device can monitor the power usage for a group of servers. For example, a server group can correspond to a data center. A server group can correspond to a server rack. Management device 104 can be configured with management software 102 to monitor the power usage of servers within data center 110. Rack management controller 204 can be configured to monitor the power usage of servers within rack 120.

At step 404, the computing device can determine that the power usage for the group of servers exceeds a first threshold level. For example, the management device 104 can determine that the power usage for data center 110 exceeds 90% of the power limit for data center 110. Rack management controller 204 can determine that the power usage for rack 120 exceeds 90% of the power limit for rack 120.

At step 406, the computing device can cause the group of servers to enter power capping mode. For example, in response to determining that the power usage for data center 110 exceeds the first threshold, management device 104 can cause data center 110 to enter power capping mode. Similarly, in response to determining that the power usage for rack 120 is greater than the first threshold, rack management controller 204 can cause rack 120 to enter power capping mode.

At step 408, the computing device can determine the amount of discretionary power available for power capping. For example, management device 104 can determine the amount of discretionary power available to distribute to data capped server racks within data center 110. Rack management controller 204 can determine the amount of discretionary power available to distribute to data capped servers within server rack 120.

At step 410, the computing device can allocate the discretionary power. For example, management device 104 can allocate the discretionary data center power to power capped racks within data center 110 according to the proportional amount of power consumed by each rack within data center 110, as described above. Rack management controller 204 can allocate the discretionary rack power to servers within rack 120 according to the proportional amount of power consumed by each server within rack 120, as described above. The amount of discretionary power allocated to rack or server becomes the power limit for the rack or server, for example.

At step 414, the computing device can determine that power usage for a group of servers is below a second threshold level. For example, management device 104 can monitor power consumption of racks within data center 110 and detect when the power consumption of the racks drops below a second threshold level (e.g., 70% of the data center power limit). Rack management controller 204 can monitor power consumption of servers within rack 120 and detect when the power consumption of the servers drops below a second threshold level (e.g., 70% of the rack power limit).

At step 416, the computing device can cause the group of servers to exit power capping mode. For example, in response to detecting that the power consumption of the racks within data center 110 has dropped below the second threshold level, management device 104 can remove the power limits from the racks within data center 110 so that the power consumption of the racks in data center 110 is no longer limited. Similarly, in response to detecting that the power consumption of the servers within rack 120 has dropped below the second threshold level, rack management controller 204 can remove the power limits from the servers within rack 120 so that the power consumption of the servers in rack 120 is no longer limited.

Example System Architecture

Figure 5:
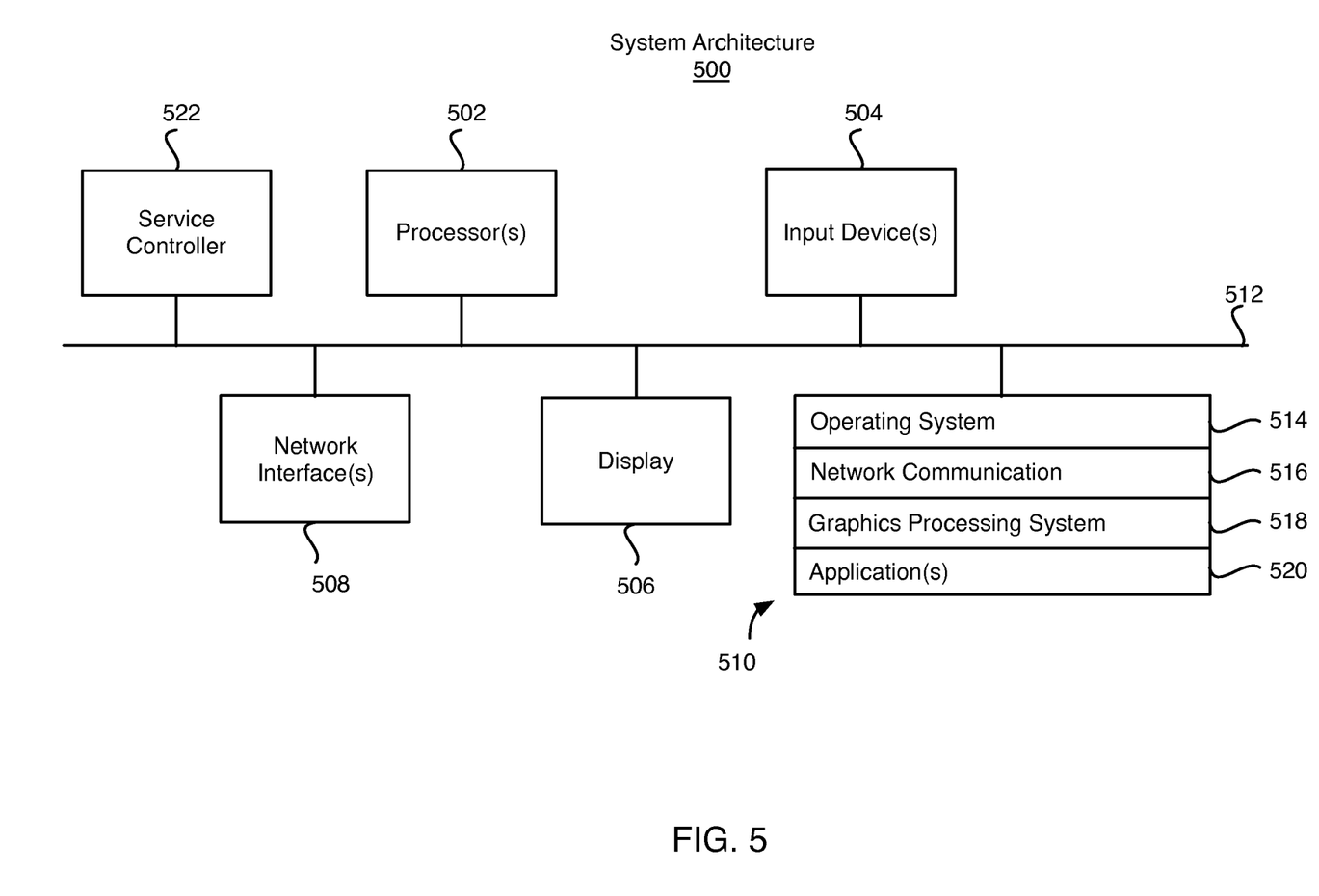
FIG. 5 is a block diagram of an example system architecture implementing the features and processes of FIGS. 1-4.

FIG. 5 is a block diagram of an example system architecture 500 implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions for implementing an operating system 514 (e.g., Mac OS®, Windows®, Linux). The operating system 514 can be multi-user, multiprocessing, multitasking, multithreading, real-time and the like. The operating system 514 performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.). In some implementations, operating system 514 can perform at least some of the processes described in reference to FIGS. 1-4, above.

A graphics processing system 518 can include instructions that provide graphics and image processing capabilities. For example, the graphics processing system 518 can implement the processes described with reference to FIGS. 1-4. Application(s) 520 can be an application that uses or implements the processes described in reference to FIGS. 1-4. For example, applications 520 can include management software 204. Application(s) 520 can include rack management controller software for managing power within a rack. Application(s) 520 can include system controller software for managing power consumption within a server.

Service controller 522 can be a controller that operates independently of processor(s) 522 and/or operating system 514. In some implementations, service controller 522 can be powered and operational before processor(s) 502 are powered on and operating system 514 is loaded into processor(s) 502. For example, service controller 522 can provide for pre-OS management of the computing device through a dedicated network interface or other input device. For example, system controller 522 can be a baseboard management controller (service controller) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 522 can be implement the processes described with reference to FIGS. 1-4 above. For example, service controller 522 can be configured to manage power consumption within a server.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
    obtaining a first power limit for a group of servers, the group of servers including a first subset of servers and a second subset of servers;
    calculating a first threshold value based on the first power limit, where the first threshold value is less than the first power limit;
    determining that power consumption for the group of servers exceeds the first threshold value;
    causing the first subset of servers to enter power capping mode when the power consumption for the group of servers exceeds the first threshold value;
    determining an amount of discretionary power available to the first subset of servers, wherein the amount of discretionary power is determined based upon the first power limit and a power consumption of the second subset of servers that do not have power capping enabled; and
    determining a portion of the discretionary power to a particular server in the first subset of servers based upon a power consumption of the particular server and a total power consumption of the first subset of servers that has power capping enabled.

2. The method of claim 1, wherein the allocated portion of the discretionary power is a power consumption limit for the particular server.

3. The method of claim 2, further comprising:
    sending the power consumption limit to the particular server, wherein the particular server's operating parameters are adjusted so that the particular server consumes less power than specified by the power consumption limit.

4. The method of claim 1, further comprising:
    monitoring power consumption for the group of servers;
    determining that the power consumption is below a second threshold value; and
    causing the group of servers to exit power capping mode when the power consumption for the group of servers drops below the second threshold value.

5. A non-transitory computer-readable medium including one or more sequences of instructions which, when executed by one or more processors, causes:
    obtaining a first power limit for a group of servers, the group of servers including a first subset of servers and a second subset of servers;
    calculating a first threshold value based on the first power limit, where the first threshold value is less than the first power limit;
    determining that power consumption for the group of servers exceeds the first threshold value;
    causing the first subset of servers to enter power capping mode when the power consumption for the group of servers exceeds the first threshold value;
    determining an amount of discretionary power available to the first subset of servers, wherein the amount of discretionary power is determined based upon the first power limit and a power consumption of the second subset of servers that do not have power capping enabled; and
    determining a portion of the discretionary power to a particular server in the first subset of servers based upon a power consumption of the particular server and a total power consumption of the first subset of servers that has power capping enabled.

6. The non-transitory computer-readable medium of claim 5, wherein the allocated portion of the discretionary power is a power consumption limit for the particular server.

7. The non-transitory computer-readable medium of claim 6, wherein the instructions cause:
sending the power consumption limit to the particular server, wherein the particular server's operating parameters are adjusted so that the particular server consumes less power than specified by the power consumption limit.

8. The non-transitory computer-readable medium of claim 5, wherein the instructions cause:
monitoring power consumption for the group of servers;
determining that the power consumption is below a second threshold value; and
causing the group of servers to exit power capping mode when the power consumption for the group of servers drops below the second threshold value.

9. A system comprising:
one or more processors; and
a non-transitory computer-readable medium including one or more sequences of instructions which, when executed by the one or more processors, causes:
obtaining a first power limit for a group of servers, the group of servers including a first subset of servers and a second subset of servers;
calculating a first threshold value based on the first power limit, where the first threshold value is less than the first power limit;
determining that power consumption for the group of servers exceeds the first threshold value;
causing the first subset of servers to enter power capping mode when the power consumption for the group of servers exceeds the first threshold value;
determining an amount of discretionary power available to the first subset of servers, wherein the amount of discretionary power is determined based upon the first power limit and a power consumption of the second subset of servers that do not have power capping enabled; and
determining a portion of the discretionary power to a particular server in the first subset of servers based upon a power consumption of the particular server and a total power consumption of the first subset of servers that has power capping enabled.

10. The system of claim 9, wherein the allocated portion of the discretionary power is a power consumption limit for the particular server.

11. The system of claim 10, wherein the instructions cause:
sending the power consumption limit to the particular server, wherein the particular server's operating parameters are adjusted so that the particular server consumes less power than specified by the power consumption limit.

12. The system of claim 9, wherein the instructions cause:
monitoring power consumption for the group of servers;
determining that the power consumption is below a second threshold value; and
causing the group of servers to exit power capping mode when the power consumption for the group of servers drops below the second threshold value.

13. The method of claim 1, wherein the second subset of servers includes one or more servers that are currently powered off.

14. The non-transitory computer-readable medium of claim 5, wherein the second subset of servers includes one or more servers that are currently powered off.

15. The system of claim 9, wherein the second subset of servers includes one or more servers that are currently powered off.

* * * * *